(12) United States Patent
Schultz

(10) Patent No.: US 12,420,694 B2
(45) Date of Patent: Sep. 23, 2025

(54) CONSTRUCTION EQUIPMENT LATTICE STRUCTURE CRADLE ASSEMBLY

(71) Applicant: Precision Specialized Services, LLC, Petal, MS (US)

(72) Inventor: Rob Schultz, Covington, KY (US)

(73) Assignee: Precision Specialized Services, LLC, Petal, MS (US)

( * ) Notice: Subject to any disclaimer, the term of this patent is extended or adjusted under 35 U.S.C. 154(b) by 506 days.

(21) Appl. No.: 18/099,138

(22) Filed: Jan. 19, 2023

(65) Prior Publication Data

US 2023/0226965 A1 Jul. 20, 2023

Related U.S. Application Data

(60) Provisional application No. 63/300,712, filed on Jan. 19, 2022.

(51) Int. Cl.
  *B60P 7/08* (2006.01)
  *B60P 3/28* (2006.01)

(52) U.S. Cl.
  CPC .. *B60P 7/08* (2013.01); *B60P 3/28* (2013.01)

(58) Field of Classification Search
  CPC .. B60P 3/28; B60P 7/08; B60P 7/0807; B60P 7/12; B60P 3/40; B60P 7/0892; B66C 25/00; B62D 33/0207
  USPC ............... 410/44, 45, 47, 120, 155
  See application file for complete search history.

(56) References Cited

U.S. PATENT DOCUMENTS

| 2,851,235 | A | * | 9/1958 | Henig | F41A 9/87 410/44 |
| 3,954,193 | A | * | 5/1976 | Whittingham | B60P 3/28 212/292 |
| 8,529,174 | B1 | * | 9/2013 | Landrum | B60P 3/40 410/44 |
| 2012/0148362 | A1 | * | 6/2012 | Lawlor | B60P 3/40 410/44 |

* cited by examiner

*Primary Examiner* — Stephen T Gordon
(74) *Attorney, Agent, or Firm* — AdamsIP, LLC; J. Hunter Adams; Edward B. Garner, III

(57) ABSTRACT

A system and method for transporting crane booms is provided. The system generally comprises end units and interior units having bolster assemblies and cradles. The bolster assembly preferably comprises a shipping cradle and crane boom. The shipping cradle comprises an upper cradle and lower cradle, wherein contoured spaces of said upper cradle and lower cradle are designed to fit a lattice structure of a crane boom. Attachment holes allow for attachment elements to secure the upper cradle to the lower cradle, thus removably securing the shipping cradle to the crane boom. Alternatively, the shipping cradle may be permanently attached to the lattice structure. The shipping cradle may also be removably secured to a flatbed, allowing the crane boom to be securely transported over long distances via said flatbed.

20 Claims, 6 Drawing Sheets

CONSTRUCTION EQUIPMENT LATTICE STRUCTURE CRADLE ASSEMBLY

CROSS REFERENCES

This application claims the benefit of U.S. Provisional Application No. 63/300,712, filed on Jan. 19, 2022, which application is incorporated herein by reference.

FIELD OF THE DISCLOSURE

The subject matter of the present disclosure refers generally to a system and method for transporting construction equipment having a lattice structure.

BACKGROUND

Crane booms can be difficult to transport over long distances. Because crane boom lattice structures are quite cumbersome, they are often broken down into multiple sections and secured to large transport vehicles, such as train or tractor trailer rigs, for transport. However, if a crane boom is damaged during transport, it must be rebuilt due to safety issues that arise caused by the heavy loads crane booms are expected to endure. As such, the transportation of crane booms must be carefully monitored and carried out, which increases cost. If not for this additional oversight, however, the increased chance of damage to crane booms could further increase the cost of construction due to the constant rebuilding of crane booms as well as increase the risk to construction workers caused by unseen damage to said crane booms that could cause structural failures at critical moments of construction. Unfortunately, current methods of transporting crane booms differ little from methods used decades ago despite improvements in crane technology, meaning crane boom transportation technology has not evolved in a way that has greatly reduced the cost and danger of transporting crane booms over long distances during that same period of time.

Accordingly, there is a need in the art for a shipping cradle designed to attach to crane booms in order to decrease the cost transportation crane booms while simultaneously decreasing the likelihood that crane boom lattice structures might suffer damage during transportation.

SUMMARY

A system and method for transporting a construction equipment via a flatbed is provided. In one aspect, the system uses removable, contoured blocks to secure a lattice structure of construction equipment to a flatbed for transportation from one site to another. In another aspect, the system is a lattice structure having blocks incorporated therein that allows for securement to a flatbed. In yet another aspect, the system may be used to track the location of the crane boom during transportation. Generally, the system and method of the present disclosure are designed for the safe transportation of construction equipment having a lattice structure. The system generally comprises a shipping cradle and construction equipment having a lattice structure.

The shipping cradle comprises an upper cradle and lower cradle, wherein contoured spaces of said upper cradle and lower cradle are designed to fit a lattice structure. Attachment holes allow for attachment elements to secure the upper cradle and lower cradle to one another and around a conduit of the lattice structure. The attachment holes of the upper cradle and lower cradle are aligned such that locking elements may extend through the apertures of the upper cradle to the apertures of the lower cradle, securing the upper cradle and lower cradle about the construction equipment. Attachment holes extending through the upper cradle and lower cradle allow for the system to be secured to a flatbed when said flatbed comprises attachment holes that align with the attachment holes of the shipping cradle.

The upper cradle and lower cradle are sized such that it fits sections of conduit where said conduit meets a main chord of the lattice structure. The upper cradle and lower cradle comprise two or more contoured spaces that are shaped in a way to snuggly clasp the conduit of the construction equipment placed therein. The contoured spaces are angled to fit the angles made by the conduit with the main chords. As such, the angles of the contoured spaces may vary depending on the shape of the lattice structure to which the shipping cradle is to be attached. The lower cradles preferably extend to the exterior of the lattice structure so that it is the most distal point of the system, which elevates the construction equipment so that only the lower cradle is in contact with the surface of the flatbed when the construction equipment is placed in a shipping position. Therefore, the system is designed in a way that prevents the construction equipment from making contact with a flatbed of a vehicle when said crane boom is secured thereto.

The foregoing summary has outlined some features of the system and method of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other structures for carrying out the same purpose of the system and method disclosed herein. Those skilled in the pertinent art should also realize that such equivalent designs or modifications do not depart from the scope of the system and method of the present disclosure.

DESCRIPTION OF THE DRAWINGS

These and other features, aspects, and advantages of the present disclosure will become better understood with regard to the following description, appended claims, and accompanying drawings where:

DETAILED DESCRIPTION

In the Summary above and in this Detailed Description, and the Claims below, and in the accompanying drawings, reference is made to particular features, including process steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally. Where reference is made herein to a process comprising two or more defined steps, the defined steps can be carried out in any order or simultaneously (except where the context excludes that possibility), and the process can include one or more other steps which are carried out before any of the defined steps, between two of the defined steps, or after all the defined steps (except where the context excludes that possibility).

The term "comprises" and grammatical equivalents thereof are used herein to mean that other components, steps, etc. are optionally present. For instance, a system "comprising" components A, B, and C can contain only components A, B, and C, or can contain not only components A, B, and C, but also one or more other components. The term "at least one of . . . and" and grammatical equivalents thereof are used herein to mean that at least one of a group of items is present but more components of that group can be present. For instance, a system comprising at least one of components A, B, and C can contain only components A and B, or can contain multiple components A and C, but only one of component B.

Figure 1:
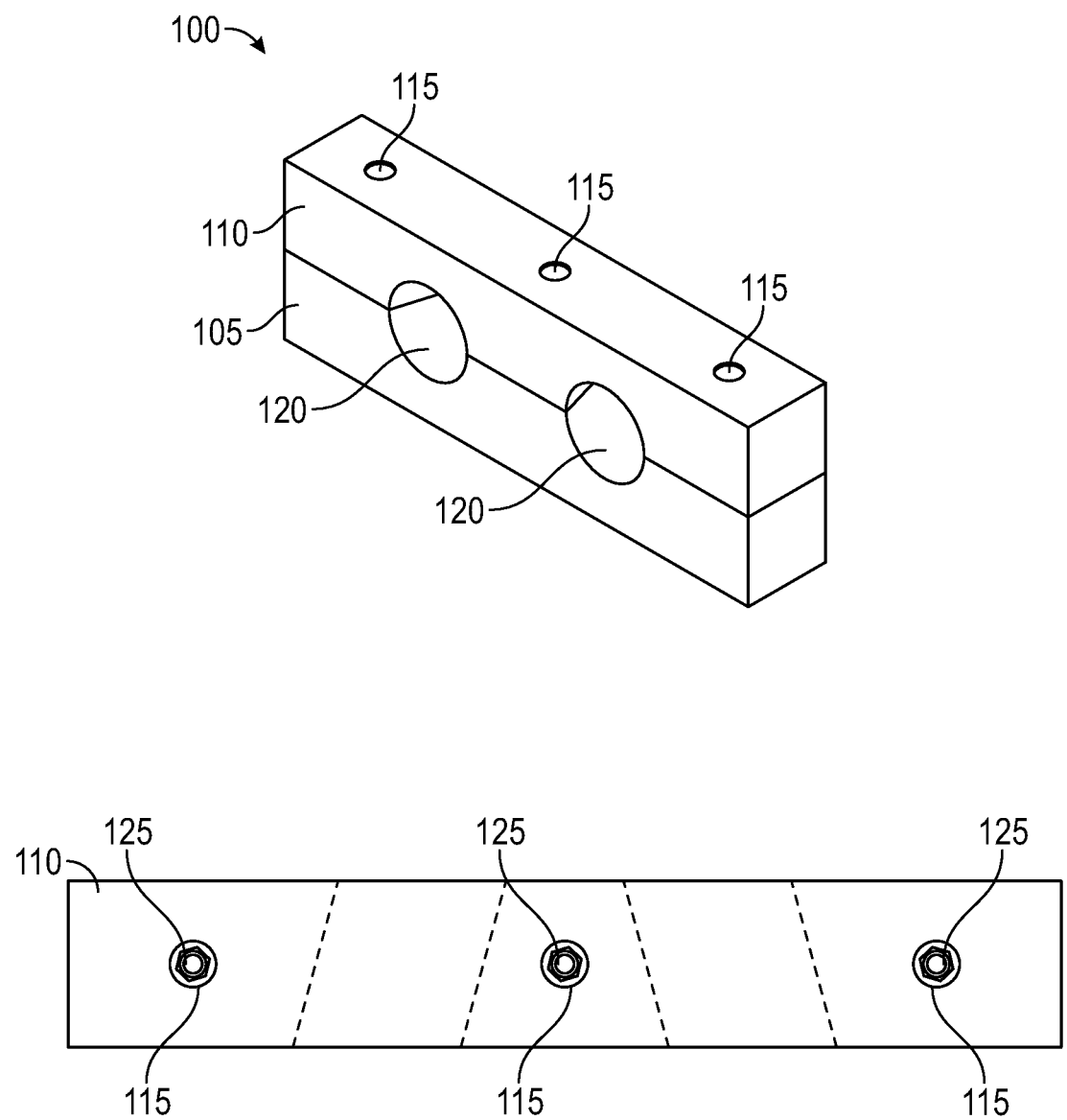
FIG. 1 is a elevated, front perspective view (top) and top view (bottom) of a shipping cradle as described herein.
Figure 2:
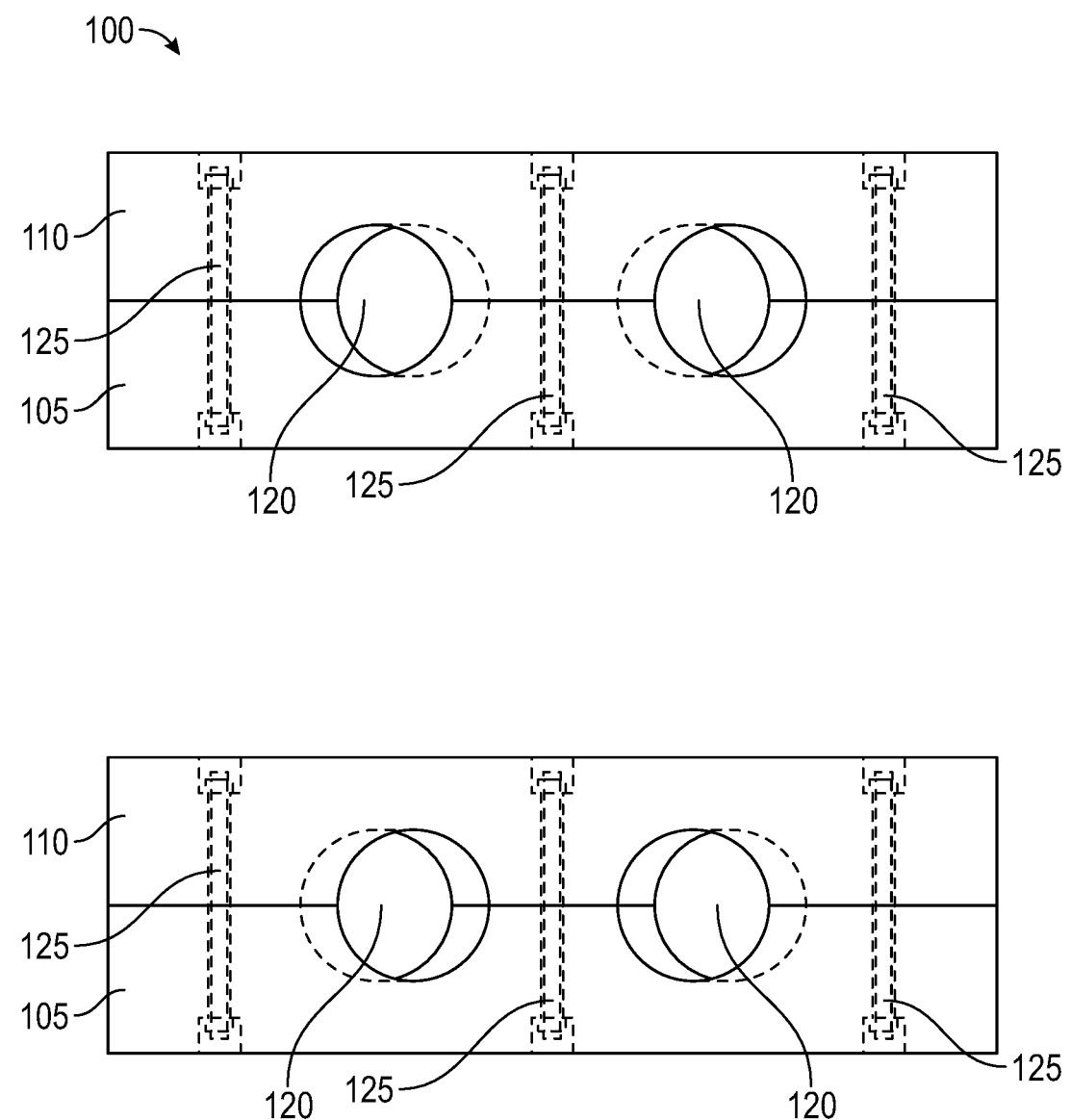
FIG. 2 is a front view (top) and back view (bottom) of a shipping cradle as described herein.
Figure 3:
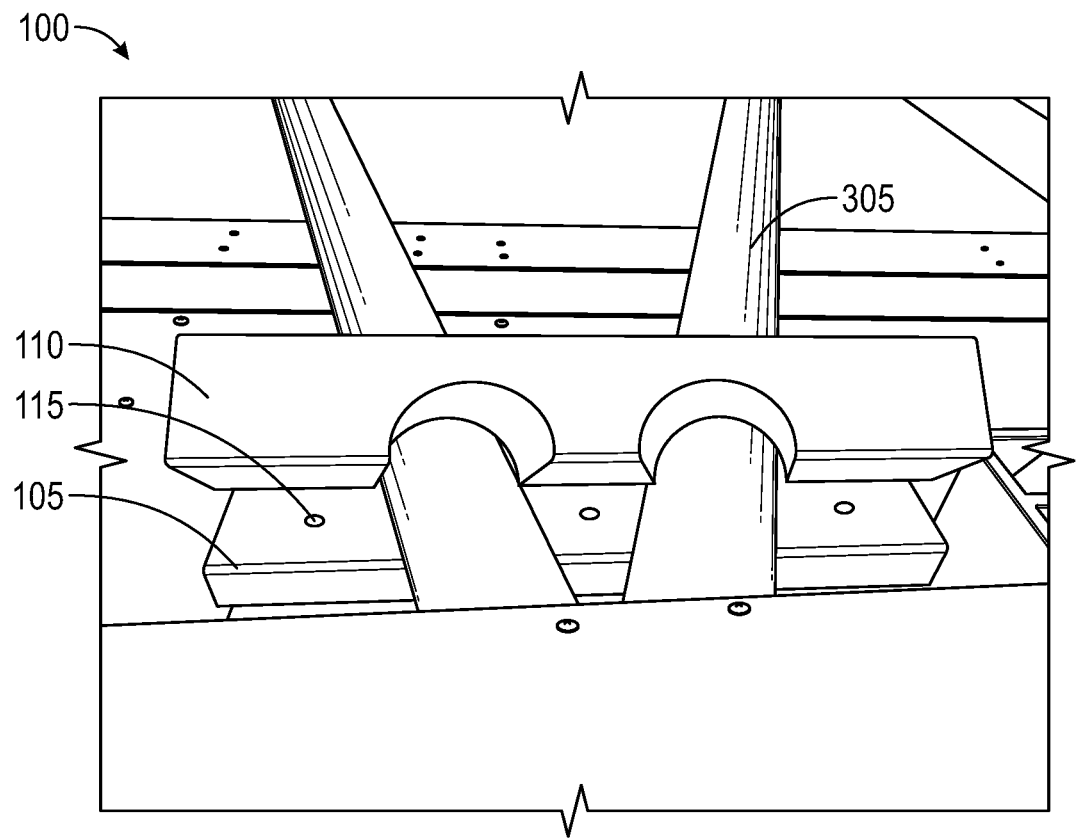
FIG. 3 is an elevated perspective view of a shipping cradle and a lattice structure of a crane boom as described herein.
Figure 4:
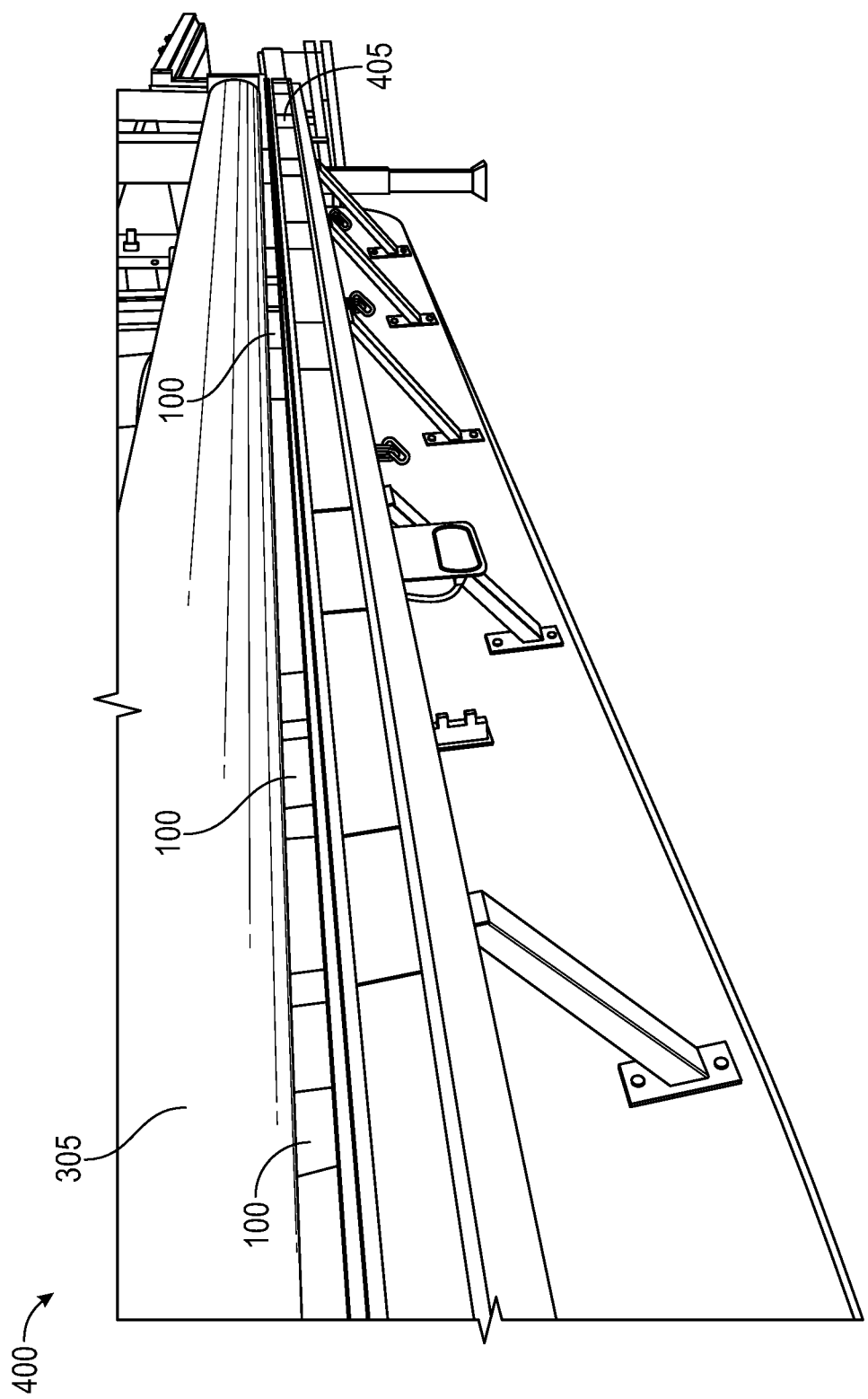
FIG. 4 is a first environmental view of a shipping cradle and crane boom secured to a vehicle as described herein.
Figure 5:
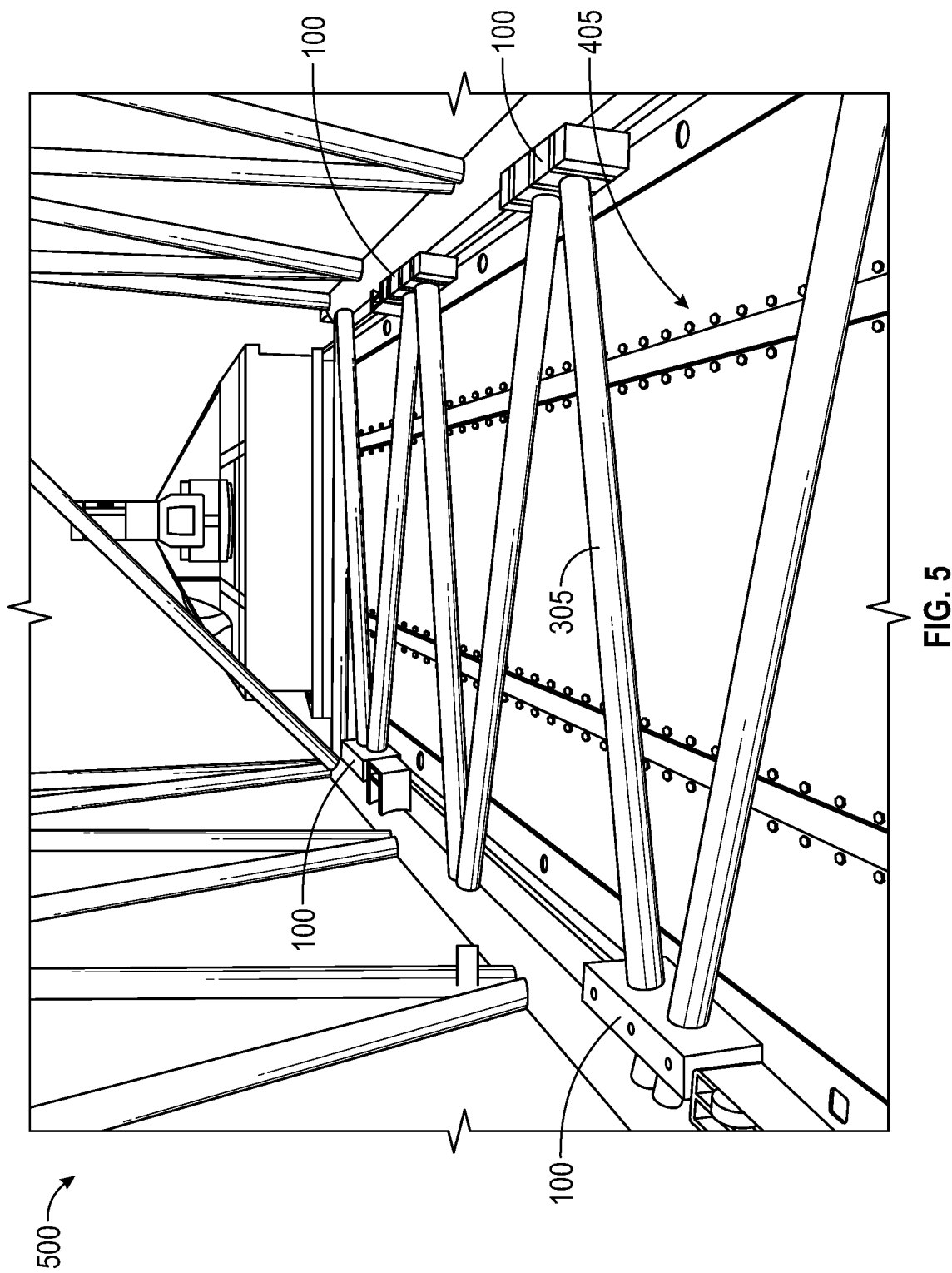
FIG. 5 is a second environmental view of a shipping cradle and crane boom secured to a vehicle as described herein.
Figure 6:
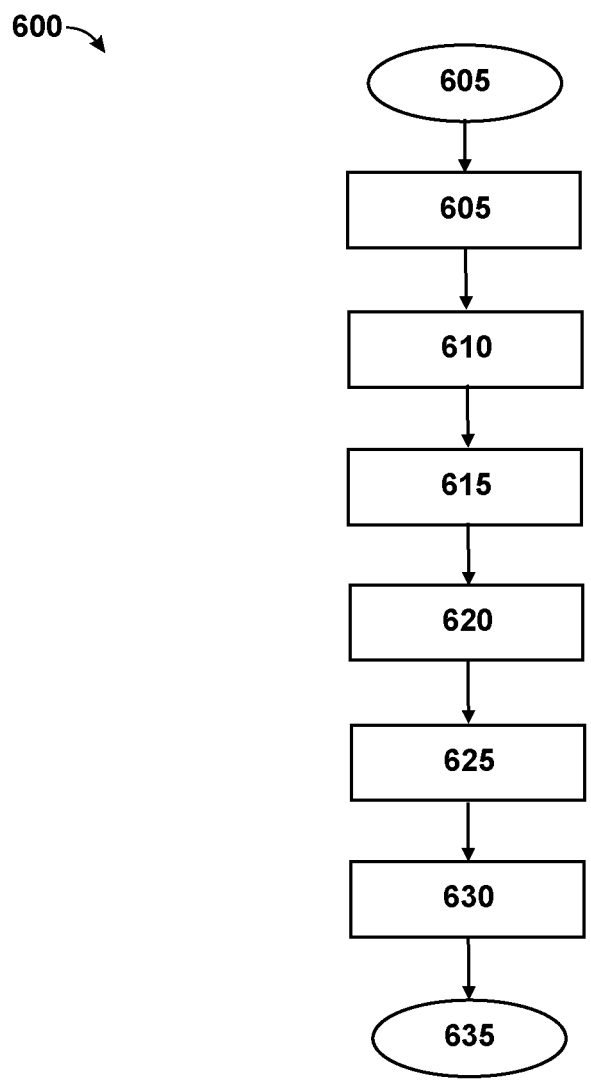
FIG. 6 is a flow chart illustrating certain method steps embodying features consistent with the principles of the present disclosure.

FIGS. 1-6 illustrate embodiments of cradle assembly used to transport construction equipment 305. FIG. 1 illustrates an elevated front perspective view (top) and a top view (bottom) of a shipping cradle 100 having an upper cradle 110 and lower cradle 105. FIG. 2 illustrates a front view (top) and back view (bottom) of a shipping cradle 100 having an upper cradle 110 and lower cradle 105. FIG. 3 illustrates an elevated perspective view of a shipping cradle 100 being secured to construction equipment 305. FIG. 4 illustrates a first environmental view 400 of a shipping cradle 100 securing construction equipment 305 to the flatbed 405 of a vehicle, wherein said view is from the side of said vehicle. FIG. 5 illustrates a second environmental 500 view of a shipping cradle 100 securing construction equipment 305 to the flatbed 405 of a vehicle, wherein said view is an elevated perspective view of said vehicle. FIG. 6 is a flow chart illustrating a method that may be used to secure a crane boom to a vehicle using the shipping cradle 100. It is understood that any method steps associated with methods of the present disclosure may be carried out by a user using the system 300 shown in FIGS. 1-5.

The system 300 generally comprises a shipping cradle 100 and construction equipment 305 having a lattice structure. As illustrated in FIG. 1, the shipping cradle 100 comprises an upper cradle 110 and lower cradle 105, wherein contoured spaces 120 of said upper cradle 110 and lower cradle 105 are designed to fit a lattice structure, and wherein attachment holes 115 of the upper cradle 110 and lower cradle 105 allow for attachment elements 125 to secure said upper cradle 110 and lower cradle 105 to one another and about said construction equipment 305. In a preferred embodiment, the contoured spaces 120 of the upper cradle 110 and lower cradle 105 are shaped to fit conduit that forms the lattice structure of the construction equipment 305. In some preferred embodiments, the shipping cradle 100 may be removably secured to the conduit of the construction equipment 305 via the locking elements, wherein the locking elements secure the upper cradle 110 and lower cradle 105 together in the manner as illustrated in FIG. 2. For instance, the upper cradle 110 and lower cradle 105 may be bolted together around the lattice structure in the manner illustrated in FIG. 3. Alternatively, the shipping cradle 100 may be permanently attached to the lattice structure. For instance, the upper cradle 110 and lower cradle 105 may be permanently welded to construction equipment 305 as illustrated in FIG. 5.

Attachment holes 115 of the upper cradle 110 and lower cradle 105 are aligned such that locking elements may extend through the attachment holes of the upper cradle 110 to the attachment holes of the lower cradle 105, thus allowing for the upper cradle 110 and lower cradle 105 to be locked together around the conduit of a lattice structure. In a preferred embodiment, attachment holes 115 extend through the upper cradle 110 and lower cradle 105 allow for the system 300 to be secured to the flatbed 405 in addition to the construction equipment 305. For instance, a shipping cradle 100 having a plurality of attachment holes 115 in the upper cradle 110 and lower cradle 105 may allow for attachment of a crane boom to a flatbed 405 of a rail car using a plurality of bolts, wherein the plurality of attachment holes 115 in the upper cradle 110 and lower cradle 105 are configured to align with a plurality of apertures of the rail car such that the plurality of bolts may secure the shipping cradle 100 and crane boom thereto. Apparatuses that may act as the attachment element 125 include, but are not limited to, push-pull pins, combination locks, bolts, screws, nails, or any combination thereof. In a preferred embodiment, the attachment element 125 used to secure the shipping cradle 100 to the flatbed 405 is a bolt, wherein the male threaded section of the bolt is configured to interlock with a female threaded section of an attachment hole when a rotational force is applied to a bolt positioned within the attachment hole. The threaded sections are preferably parallel but may be tapered or a combination of tapered and parallel without departing from inventive subject matter herein. A head of the bolt is preferably larger than the apertures of the shipping cradle 100 and/or the apertures of the flatbed 405, preventing the bolt from mating with the attachment holes and/or apertures further than said head.

The upper cradle 110 and lower cradle 105 are molded such that it fits between and around sections of conduit that form the lattice structure of the construction equipment. Preferably, the upper cradle 110 and lower cradle 105 are configured to fit about the conduit where said conduit meets the main chords of the lattice structure. As previously mentioned, the upper cradle 110 and lower cradle 105 comprise two or more contoured spaces 120 that are shaped in a way to snuggly clasp about the conduit of the construction equipment 305 placed therein. The contoured spaces 120 are preferably angled towards one another such that the openings created by the contoured spaces 120 on the front of the shipping cradle 100 are further apart than the openings created by the contoured spaces 120 on the back of the shipping cradle 100. The system 300 may be used with top lattice structures, bottom lattice structures, and middle lattice structures, or any combination thereof. Therefore, the angles created by the contoured spaces 120 may vary from lattice structure to lattice structure, depending on the shape of said lattice structure.

As illustrated in FIG. 4, the shipping cradle 100 preferably extends to the exterior of the lattice structure in a way that causes the construction equipment 305 to be elevated when placed in a shipping position (i.e., laid on one side). Therefore, in a preferred embodiment, the shipping cradle 100 prevents the construction equipment 305 from making contact with a flatbed 405 of a vehicle when said construction equipment 305 is secured to said vehicle for transportation. This protects the lattice structure from damage, thus decreasing the likelihood that the lattice structure will fail under stress. Further, due to the angles of the lattice structure and the design of the cradle 100, construction equipment 305 cannot move about within the shipping cradle 100 while being transported. Accordingly, construction equipment 305 having a lattice structure that is secured to a flatbed using a shipping cradle 100 will increase stability of a loaded flatbed 405 by decreasing the shifting of the load during transportation. This in turn will increase the safety of transporting large pieces of construction equipment 305 having lattice structures.

The material used to construct the upper cradle 110 and lower cradle 105 preferably has a Brinell Hardness Number of 12 or less. In another preferred embodiment, the material used to construct the upper cradle 110 and lower cradle 105 has a tensile strength greater than 25 MPa. Materials that may be used to construct the upper cradle 110 and lower cradle 105 include, but are not limited to, polymer, wood, compressed fiber, or any combination thereof. In a preferred embodiment, the material used to construct the cradle is a recyclable polymer, such as thermoplastics, thermoset polymers, and epoxy resins. The use of recyclable polymers will allow for cradles that have been damaged (or exceeded their useful lifespan) to be melted and recast, reducing waste and cost. Alternatively, metal can be used to create the upper cradle 110 and lower cradle 105, which may allow the upper cradle 110 and lower cradle 105 to be permanently secured the lattice structure by a means such as welding. In yet another preferred embodiment, the upper cradle 110 and lower cradle 105 may partially comprise metal and partially comprise a softer material, such as polymer. For instance, the attachment holes 115 may each have a lag bolt anchor set therein. When a lag bolt is inserted into said attachment holes 115, the lag bolt anchor may expand, reducing the likelihood that an attachment element 125 may become loosened from said attachment hole.

When using the system 300 to secure a lattice structure to a vehicle, at least four shipping cradles 100 are secured to the construction equipment 305 in the manner illustrated in FIG. 5. However, more or fewer shipping cradles 100 may be secured to the lattice structure of the construction equipment 305 without departing from the inventive subject matter described herein. The shipping cradles 100 are preferably placed about the construction equipment 305 such that each shipping cradle 100 of the plurality of shipping cradles 100 support as close to an equal amount of weight as possible when said construction equipment 305 is secured to a vehicle in a shipping position. This will reduce the amount of strain placed on the conduit of the lattice structure; therefore, reducing the likelihood the conduit will be damaged from the stress of travel. As such, some preferred embodiments may require that a shipping cradle 100 be placed at each point in which the conduit that forms the lattice is connected to a main chord in order to maximize weight distribution and reduce the effective weight supported by each shipping cradle 100.

Some preferred embodiments of the system 300 may further comprise a global positioning system (GPS) that allow for the tracking of the construction equipment 305 during transport. In a preferred embodiment, the GPS is secured to the exterior of the shipping cradle 100 or incorporated into the shipping cradle 100. The GPS 122 is configured to transmit geospatial data to a processor of a computing device in a way that allows a processor of the computing device determine the geolocation of the construction equipment 305. As used herein, geospatial data may be spatial data including, but not limited to, numeric data, vector data, and raster data, or any combination thereof. Numeric data may be statistical data which includes a geographical component or field that can be joined with vector files so the data may be queried and displayed as a layer on a map in a GIS. Vector data may be data that has a spatial component, or X, Y coordinates assigned to it. Vector data may contain sets of points, lines, or polygons that are referenced in a geographic space. Raster data may be data in a .JPG, .TIF, .GIF or other picture file format. For instance, a map scanned in a flatbed scanner may be considered raster data.

In yet another preferred embodiment, the system 300 may comprise a plurality of sensors configured to detect shifting of the lattice structure about the flatbed. The plurality of sensors is preferably configured to detect movement data and send it to a computing device so that the computing device may determine if the construction equipment 305 has shifted about the vehicle to which it is attached. When the system 300 determines that the construction equipment 305 has shifted, the computing device may be configured to alert the driver of the vehicle so that they may stop said vehicle to prevent an accident. In a preferred embodiment, the at least one sensor is secured to the exterior of the shipping cradle 100 and/or incorporated into the shipping cradle 100 and may include, but is not limited to, an accelerometer and gyroscope. Movement data detected by the at least one sensor may include, but is not limited to, acceleration data and angular velocity data.

FIG. 6 provides a flow chart 600 illustrating certain, preferred method steps that may be used to carry out the process of securing shipping cradles 100 to a construction equipment 305 and subsequently securing said shipping cradles 100 and construction equipment 305 to a flatbed 405 of a vehicle. Step 605 indicates the beginning of the method. During step 610, a user may obtain at least four shipping cradles 100 and a construction equipment 305 having a lattice structure. Once acquired, the user may obtain a vehicle configured to allow for the attachment said shipping cradles 100 and said construction equipment 305 during step 615. In a preferred embodiment, an 89' flatcar may be used as the vehicle to which the shipping cradles 100 and construction equipment 305 are attached. The user may proceed to attach the shipping cradles 100 to the lattice structure of the construction equipment 305 during step 620, making sure that the shipping cradles 100 are oriented in way that distributes the weight of the construction equipment 305 supported by each shipping cradle 100 most evenly. The shipping cradles 100 are preferably attached to the construction equipment 305 via bolts, screws, or weld, depending on the material of the shipping cradle 100 and construction equipment 305.

Once the shipping cradles 100 have been attached to the construction equipment 305, the user may place the construction equipment 305 and shipping cradles 100 on a flat surface of the vehicle during step 625 in a way such that the shipping cradles 100 are in contact with said flat surface and said construction equipment 305 is elevated away from said surface by said shipping cradles 100. Once the construction equipment 305 and shipping cradles 100 are in position, the user may secure the construction equipment 305 and shipping cradles 100 to the vehicle using an attachment element 125 during step 630. In a preferred embodiment, bolts are used to secure the shipping cradle 100 to the flatbed 405 via the attachment holes 115 of the shipping cradle 100, which also secures the construction equipment 305 to said vehicle.

Once the construction equipment 305 has been secured to the flatbed 405, the user may proceed to terminate method step 635.

Although the systems and methods of the present disclosure have been discussed for use within the pipe transportation attachment field, one of skill in the art will appreciate that the inventive subject matter disclosed herein may be utilized in other fields or for other applications in which the transport of building materials is needed. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flow depicted in the accompanying figures and/or described herein do not necessarily require the particular order shown, or sequential order, to achieve desirable results unless otherwise stated. It will be readily understood to those skilled in the art that various other changes in the details, materials, and arrangements of the parts and process stages which have been described and illustrated in order to explain the nature of this inventive subject matter can be made without departing from the principles and scope of the inventive subject matter.

The invention claimed is:

1. A system for securing construction equipment to a flatbed comprising:
 a shipping cradle having an upper cradle and a lower cradle,
   wherein said upper cradle and said lower cradle are secured to one another via attachment elements,
   wherein said upper cradle and lower cradle are configured to secure around at least two pieces of conduit of a lattice structure,
   wherein said lattice structure is a support structure of construction equipment,
   wherein at least two contoured spaces of said upper cradle and said lower cradle are aligned to form at least two channels in which to secure said at least two pieces of conduit,
   wherein said at least two channels are angled in a way such that a distance of a front opening of a first channel and said front opening of a second channel are closer than said distance of a back opening of said first channel and a back opening of said second channel, and
   wherein an angle created between said at least two channels is equal to said angle created between a main chord of said lattice structure and said at least two pieces of conduit.

2. The system of claim 1, further comprising said construction equipment having the lattice structure,
 wherein said lattice structure comprises a plurality of conduits attached to at least three main chords,
 wherein said plurality of conduits is oriented between said at least three main chords in a way that provides said lattice structure with structural integrity.

3. The system of claim 2, further comprising a vehicle having a flatbed having a plurality of apertures configured to accept said attachment elements.

4. The system of claim 3, wherein four of said shipping cradles are secured to one side of said lattice structure via said attachment elements, wherein said lattice structure and said shipping cradles are situated on said flatbed such that said shipping cradles are in contact with said flatbed and said lattice structure is in an elevated position relative said flatbed.

5. The system of claim 4, wherein a weight of said lattice structure is distributed such that a total weight of said construction equipment is equally distributed between at least two of said shipping cradles.

6. The system of claim 4, wherein said shipping cradles and said lattice structure are secured to said flatbed via said attachment elements.

7. The system of claim 6, wherein said attachment elements used to secure said shipping cradle to said lattice structure are also used to secure said shipping cradle to said flatbed.

8. The system of claim 1, wherein said construction equipment is a crane boom.

9. The system of claim 1, wherein an angle of said at least two channels with a main chord is equal to said angle made between said at least two pieces of conduit and said main chord.

10. A system for securing construction equipment to a flatbed comprising:
 construction equipment having a lattice structure,
   wherein said lattice structure comprises a plurality of conduits attached to at least three main chords,
   wherein said plurality of conduits is oriented between said at least three main chords in a way that gives the lattice structure a structural integrity, and
 at least four shipping cradles having an upper cradle and a lower cradle,
   wherein said upper cradle and said lower cradle are secured to one another via attachment elements,
   wherein said upper cradle and lower cradle are secured around at least two pieces of conduit of said plurality of conduits of said lattice structure,
   wherein said lattice structure is a support structure of construction equipment,
   wherein at least two contoured spaces of said upper cradle and said lower cradle are aligned to form at least two channels in which to secure said at least two pieces of conduit,
   wherein said at least two channels are angled in a way such that a distance of a front opening of a first channel and a second channel are closer than a distance of a back opening of said first channel and said second channel,
   wherein an angle of said at least two channels with a main chord is equal to the angle made between said at least two pieces of conduit and said main chord,
   wherein said distance of said front openings is equal to a distance where a first conduit and second conduit of said plurality of conduits attach to a main chord of said lattice structure,
   wherein said at least four shipping cradles extend to an exterior of said lattice structure.

11. The system of claim 10, further comprising a vehicle having a flatbed,
 wherein said flatbed comprises a plurality of apertures configured to accept said attachment elements.

12. The system of claim 11, wherein said at least four shipping cradles are secured to one side of said lattice structure via said attachment elements, wherein said lattice structure and said at least four shipping cradles are situated on said flatbed such that said at least four shipping cradles are in contact with said flatbed and said lattice structure is in an elevated position relative said flatbed.

13. The system of claim 12, wherein a weight of said lattice structure is distributed such that a total weight of said construction equipment is equally distributed between at least two of said at least four shipping cradles.

14. The system of claim 12, wherein said attachment elements used to secure said at least four shipping cradles to said lattice structure are also used to secure said at least four shipping cradles to said flatbed.

15. The system of claim 10, wherein said construction equipment is a crane boom.

16. A method for securing a construction equipment to a vehicle comprising steps of:
   obtaining a construction equipment having a lattice structure,
   obtaining at least four shipping cradles having an upper cradle and a lower cradle,
      wherein at least two contoured spaces of said upper cradle and said lower cradle are aligned to form at least two channels in which to secure at least two pieces of conduit,
      wherein said at least two channels are angled in a way such that a distance of a front opening of a first channel and a second channel are closer than a distance of a back opening of said first channel and said second channel,
   obtaining a vehicle having a flatbed configured to support said construction equipment and accept said at least four shipping cradles,
   securing said at least four shipping cradles to said lattice structure,
      wherein a weight of said lattice structure is distributed such that a total weight of said construction equipment is equally distributed between at least two of said at least four shipping cradles when secured to said flatbed,
   placing said construction equipment and said at least four shipping cradles on said flatbed,
      wherein said at least four shipping cradles are in contact with a surface of said flatbed and said construction equipment is in an elevated position relative said surface,
      wherein a plurality of attachment holes of said at least four shipping cradles align with a plurality of apertures of said flatbed, and
   securing said at least four shipping cradles to said flatbed using attachment elements,
      wherein said attachment elements are inserted through said plurality of attachment holes of said at least four shipping cradles and into said plurality of apertures.

17. The method of claim 16, wherein said lattice structure of said construction equipment comprises a plurality of conduits attached to at least three main chords, wherein said plurality of conduits is oriented between said at least three main chords in a way that gives the construction equipment a structural integrity.

18. The method of claim 16, wherein an angle of said at least two channels with a main chord is equal to the angle made between said at least two pieces of conduit and said main chord.

19. The method of claim 16, wherein said distance of said front openings is equal to said distance where a first conduit and second conduit attach to a main chord of said lattice structure.

20. The method of claim 16, wherein said construction equipment is a crane boom.

* * * * *